(12) United States Patent
Sekiguchi (10) Patent No.: US 9,656,305 B2
(45) Date of Patent: May 23, 2017

(54) TIRE CLEANING METHOD

(71) Applicant: The Yokohama Rubber Co., LTD., Minato-ku, Tokyo (JP)

(72) Inventor: Takumi Sekiguchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/409,451

(22) PCT Filed: Apr. 25, 2013

(86) PCT No.: PCT/JP2013/062226
§ 371 (c)(1),
(2) Date: Dec. 18, 2014

(87) PCT Pub. No.: WO2013/190908
PCT Pub. Date: Dec. 27, 2013

(65) Prior Publication Data
US 2015/0321229 A1    Nov. 12, 2015

(30) Foreign Application Priority Data

Jun. 18, 2012 (JP) ................. 2012-136878

(51) Int. Cl.
*B08B 9/00* (2006.01)
*B29C 73/02* (2006.01)
*B29C 73/16* (2006.01)
*B60S 3/04* (2006.01)

(52) U.S. Cl.
CPC ............. *B08B 9/00* (2013.01); *B29C 73/02* (2013.01); *B29C 73/166* (2013.01); *B60S 3/042* (2013.01)

(58) Field of Classification Search
None
See application file for complete search history.

(56) References Cited

U.S. PATENT DOCUMENTS

| 4,033,511 | A | * | 7/1977 | Chamberlin | .......... B05B 7/2416 239/346 |
| 5,927,348 | A | | 7/1999 | Gerresheim et al. | |
| 2012/0312387 | A1 | | 12/2012 | Sekiguchi | |

FOREIGN PATENT DOCUMENTS

| JP | H10-067212 | 3/1998 |
| JP | 2003-127242 | 5/2003 |
| JP | 2006-248081 | 9/2006 |
| JP | 2007-331210 | 12/2007 |

(Continued)

OTHER PUBLICATIONS

Slime, slime Faqs, Apr. 19, 2012, Slime , p. 1-2.*

(Continued)

*Primary Examiner* — Binh X Tran
*Assistant Examiner* — David Cathey, Jr.
(74) *Attorney, Agent, or Firm* — Thorpe North & Western (57) ABSTRACT

A tire cleaning method according to the present technology is a method of cleaning a tire in which puncture repair liquid has been used, comprising the steps of: recovering puncture repair liquid from an inside of a tire before removing the tire from a rim of a wheel; injecting cleaning liquid into the inside of the tire from which the puncture repair liquid has been recovered; cleaning the inside of the tire with the cleaning liquid by moving the tire; and removing the cleaning liquid from the inside of the cleaned tire.

10 Claims, 9 Drawing Sheets

(56) References Cited

FOREIGN PATENT DOCUMENTS

| JP | 2009-138112 | 6/2009 |
|---|---|---|
| JP | 2010-000683 | 1/2010 |
| JP | 4743325 | 8/2011 |
| JP | 4743327 | 8/2011 |
| JP | 4743328 | 8/2011 |

OTHER PUBLICATIONS

Dale, How to Remove Slime from your Car Tire, YouTube, Date Stamp, Frame captures at 0:00, 0:08, 0:15, 1:01, 1:07, 1:27, 1:50, 2:09, 2:39.*
Gempler, Installing Liquid Ballast in Tires, Jun. 20, 2010, Gempler Date Stamp, p. 1-2.*
Norwood, slime, Nov. 12, 2005, Norwood, Date Stamp, first page though second page.*
Zinn, Technical FAQ: Tire sealants, Jan. 13, 2010, Velo news, p. 1-5.*
Dale, How to Remove Slime from your Car Tire, YouTube, Date Stamp, Frame captures at 0:00, 0:08, 0:15, 1:01, 1:07, 1:27, 1:50, 2:09, 2:39, 1:09, 1:10, 1:20.*
Highlifter, can i reuse tire slime?, Oct. 8, 2004, Highlifter, one page.*
International Search Report for International Application No. PCT/JP2013/062226 dated Jun. 4, 2013, 2 pages, Japan.

* cited by examiner

TIRE CLEANING METHOD

TECHNICAL FIELD

The present technology relates to a tire cleaning method in which tire repair liquid has been used, and more particularly relates to a tire cleaning method that enables the operation of replacing a tire on which tire repair liquid has been used to be rapidly carried out.

BACKGROUND

In recent years, when a tire mounted on a vehicle has punctured, a puncture repair liquid is injected into the tire via a tire valve to thereby temporarily repair the puncture, while, at the same time, filling the tire with air.

However, in a puncture repair method such as described above, puncture repair liquid remains inside the tire, so when the tire is removed from the wheel and changed, the puncture repair liquid can leak from the tire and cause problems such as contamination of the tire changer and the like.

Various methods to prevent leakage of puncture repair liquid have been proposed as countermeasures against this. For example, a method has been proposed in which the tire valve is removed from the wheel, a tube is inserted into the tire from the tire valve installation hole, and the puncture repair liquid within the tire is recovered via the tube (for example, see Japanese Unexamined Patent Application Publication Nos. H10-67212A and 2003-127242A and U.S. Pat. No. 5,927,348A).

Also, a method has been proposed in which a tool is inserted between the rim of the wheel and the bead portion of the tire, a tube is inserted into the tire from the gap, and the puncture repair liquid within the tire is recovered via the tube (for example, see Japanese Unexamined Patent Application Publication No. 2010-683A).

In addition, a method has been proposed in which the valve core is removed from the tire valve of the wheel, a tube is inserted into the tire valve, and the puncture repair liquid within the tire is recovered via the tube, using the action of releasing the pressure within the tire (for example, see Japanese Patent Nos. 4743325B2, 4743327B2 and 4743328B2).

However, the puncture repair liquid has a certain amount of viscosity, so even when the puncture repair liquid has been removed from within the tire immediately after the tire has been driven, puncture repair liquid remains adhering to the tire inner surface and the rim. Therefore, it is necessary to wipe the puncture repair liquid adhering to the tire inner surfaces and the rim after removing the tire from the rim using a cloth or the like. Also, if the puncture repair liquid is removed after waiting until the puncture repair liquid adhering to the tire inner surfaces and the rim drops to the bottom in the tire that has been driven and left leaning substantially upright for a while, it is possible to reduce the operation of wiping. However, the operation of changing a tire cannot be rapidly carried out if it is necessary to wait until the puncture repair liquid has dropped to the bottom.

SUMMARY

The present technology provides a tire cleaning method that enables the operation of replacing a tire in which tire repair liquid has been used to be rapidly carried out.

A tire cleaning method according to an example of the present technology is a method of cleaning a tire in which puncture repair liquid has been used, comprising the steps of: recovering the puncture repair liquid from inside the tire before removing the tire from a rim of a wheel; injecting cleaning liquid into the tire from which the puncture repair liquid has been recovered; cleaning the inside of the tire with the cleaning liquid by moving the tire; and removing the cleaning liquid from inside the cleaned tire.

Additionally, a tire cleaning method according to an example of the present technology is a method of cleaning a tire in which puncture repair liquid has been used, comprising the steps of: removing a valve core from a tire valve of a wheel to which a tire that includes puncture repair liquid is fitted; inserting a tube via the tire valve so that it reaches the inside surface of the tire; recovering the puncture repair liquid from inside the tire via the tube, using the action of releasing pressure within the tire; injecting cleaning liquid into the tire from which the puncture repair liquid has been recovered via the tire valve; cleaning the inside of the tire with the cleaning liquid by moving the tire; opening the tire valve after increasing the internal pressure of the cleaned tire; inserting a tube via the tire valve so that it reaches the inside surface of the tire; and removing the cleaning liquid from inside the tire via the tube, using the action of releasing pressure within the tire.

Furthermore, a tire cleaning method according to an example of the present technology is a method of cleaning a tire in which puncture repair liquid has been used, comprising the steps of: removing a valve core from a tire valve of a wheel to which a tire that includes puncture repair liquid is fitted; inserting a tube via the tire valve so that it reaches the inside surface of the tire; recovering the puncture repair liquid from inside the tire via the tube, using the action of releasing pressure within the tire; connecting a bottle containing cleaning liquid between the tire valve and a compressed air supply source; injecting cleaning liquid together with compressed air supplied from the compressed air supply source into the tire via the tire valve; cleaning the inside of the tire with the cleaning liquid by moving the tire; opening the tire valve after cleaning; inserting a tube via the tire valve so that it reaches an inside surface of the tire; and removing the cleaning liquid from inside the tire via the tube, using the action of releasing pressure within the tire.

In the present technology, for handling puncture repair liquid after being used in the tire, the puncture repair liquid is recovered from inside the tire before removing the tire from the rim of the wheel, then cleaning liquid is injected inside the tire, the inside of the tire is cleaned by moving the tire, and the cleaning liquid is removed from inside the tire after cleaning; so even when the puncture repair liquid is removed from inside the tire immediately after driving the tire, the amount of the puncture repair liquid adhering to the inside surface of the tire and the rim is reduced, so it is possible to rapidly carry out the operation of changing the tire. Also, because the quantity of puncture repair liquid adhering to the inside surfaces of the tire and the rim is reduced, the operation of wiping the puncture repair liquid is simplified, and it is also possible to prevent contamination of the workplace.

In the present technology, preferably the process of recovering the puncture repair liquid, the process of injecting the cleaning liquid, and the process of removing the cleaning liquid are carried out via a tire valve, and the series of operations is carried out with the tire fitted to the rim of the wheel. In this way the series of operations can be efficiently carried out, and, moreover, it is possible to prevent leakage of cleaning liquid from within the tire during cleaning.

In the process of injecting the cleaning liquid, preferably the tire is stood in an upright position, the position of injecting the cleaning liquid is arranged on the upper side of the tire, and the cleaning liquid is injected while applying the cleaning liquid to the rim of the wheel. In this way, when injecting the cleaning liquid, it is possible to directly apply the cleaning liquid to the rim, so it is possible to efficiently carry out the cleaning operation, which contributes to reducing the operation time.

BRIEF DESCRIPTION OF THE DRAWINGS

FIG. 1 illustrates the tire cleaning method according to an embodiment of the present technology.

FIG. 6 illustrates the tire cleaning method according to another embodiment of the present technology.

FIG. 7 illustrates the tire cleaning method according to yet another embodiment of the present technology.

FIG. 10 illustrates an example of the tube used in the present technology, FIG. 11 illustrates an example of the tube used in the present technology.

DETAILED DESCRIPTION

Detailed descriptions will be given below of a configuration of the present technology with reference to the accompanying drawings. FIG. 1 illustrates the tire cleaning method according to an embodiment of the present technology. In FIG. 1, 1 is a pneumatic tire, 2 is a wheel, 3 is a rim of the wheel 2, and 4 is a tire valve installed on the wheel 2.

If the tire 1 is punctured, the puncture is rapidly repaired by injecting puncture repair liquid 5 into the tire 1 via the tire valve 4, and at the same time the tire 1 is filled with air. Then the tire 1 on which this emergency measure has been taken is replaced as appropriate. When doing so the inside of the tire 1 is cleaned after recovering the puncture repair liquid 5 by the following procedure, so that puncture repair liquid 5 does not leak from the tire 1 when removing the tire 1 from the wheel 2 to replace it.

Figure 1A:
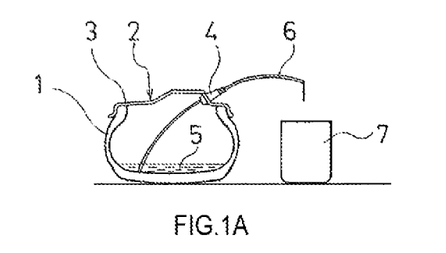
FIG. 1A is a cross-sectional view illustrating the process of recovering the puncture repair liquid.

First, as illustrated in FIG. 1A, before removing the tire 1 from the rim 3 of the wheel 2, the puncture repair liquid 5 is recovered from inside the tire 1. In this case, a valve core that is not illustrated in the drawings is removed from the tire valve 4, then a tube 6 is inserted from the tire valve 4 so that it reaches the inside surface of the tire 1, and the puncture repair liquid 5 is recovered via the tube 6 and stored in a container 7.

Figure 1B:
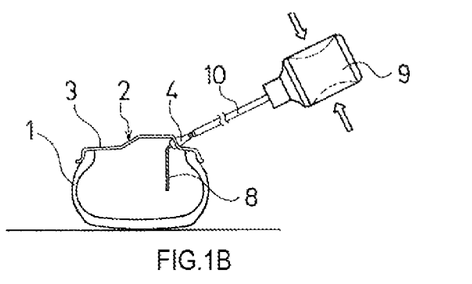
FIG. 1B is a cross-sectional view illustrating the process of injecting the cleaning liquid.

Next, as illustrated in FIG. 1B, a bottle 9 containing cleaning liquid 8 is connected to the tire valve 4 via a hose 10, and the cleaning liquid 8 is injected into the tire 1 by squeezing the bottle 9. There is no particular limitation on the cleaning liquid 8, but water or low concentration soapy water or the like can be used. The greater the quantity of cleaning liquid 8 injected the greater the cleaning effect, but preferably the quantity is from 300 ml to 500 ml based on considerations of operability.

Figure 1C:
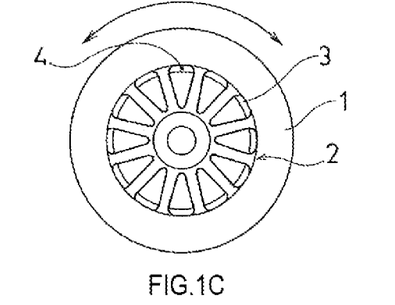
FIG. 1C is a side view illustrating the cleaning process.

Next, as illustrated in FIG. 1C, the inside of the tire 1 is cleaned with the cleaning liquid 8 by moving the tire 1. In this case, the tire 1 is in an upright position with the rotational axis in the horizontal direction, from this state preferably the tire 1 is rolled, the tire 1 is tilted, and again the tire 1 is stood upright, repeatedly. In this way, the cleaning liquid 8 is moved in the tire circumferential direction and the tire width direction of the tire 1, and it is possible to effectively clean puncture repair liquid 5 adhering to the inside surface of the tire 1 and the rim 3. Also, if the operation is carried out without removing the tire 1 from the vehicle, the tire 1 may be just rotated about the rotational axis.

Figure 1D:
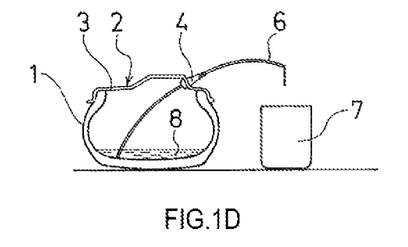
FIG. 1D is a cross-sectional view illustrating the process of removing the cleaning liquid.

Next, as illustrated in FIG. 1D, the cleaning liquid 8 is removed from inside the tire 1. In this case, the tube 6 is inserted from the tire valve 4 so that it reaches the inside surface of the tire 1, the cleaning liquid 8 is removed via the tube 6 and stored in the container 7.

After cleaning the tire 1, the tire 1 is removed from the rim 3 of the wheel 2, and if necessary the inside surfaces of the tire 1 that has been cleaned with the cleaning liquid 8 are wiped with a cloth or the like. Then, the punctured tire 1 is reused after it has been repaired, or exchanged with another tire.

According to the tire cleaning method described above, the puncture repair liquid 5 is recovered from inside the tire 1 before removing the tire 1 from the rim 3 of the wheel 2, cleaning liquid 8 is injected inside the tire 1, the inside of the tire 1 is cleaned with the cleaning liquid 8 by moving the tire 1, and the cleaning liquid 8 is removed from inside the tire 1 after cleaning; so even if the puncture repair liquid 5 is removed from inside the tire 1 immediately after the tire 1 has been driven, the quantity of puncture repair liquid 5 adhering to the inside surfaces of the tire 1 and the rim 3 is reduced, so it is possible to speed up the process of replacing the tire 1. Also, because the quantity of puncture repair liquid 5 adhering to the inside surfaces of the tire 1 and the rim 3 is reduced, the operation of wiping the puncture repair liquid 5 is simplified, and it is also possible to prevent contamination of the workplace.

In the embodiment described above, the process of recovering the puncture repair liquid 5, the process of injecting the cleaning liquid 8, and the process of removing the cleaning liquid 8 are carried out via the tire valve 4, and the series of operations is carried out with the tire 1 fitted to the rim 3 of the wheel 2. In this case the series of operations can be efficiently carried out, and moreover it is possible to prevent leakage of cleaning liquid 8 from within the tire 1 during cleaning.

In particular, preferably in the process of recovering the puncture repair liquid 5, the puncture repair liquid 5 is recovered via the tube 6 from inside the tire 1 using the action of releasing the pressure inside the tire 1, and in the process of removing the cleaning liquid 8, the cleaning liquid 8 is removed from inside the tire 1 via the tube 6 using the action of releasing the pressure inside the tire 1. The process of recovering the puncture repair liquid 5 and the process of removing the cleaning liquid 8 using the action of releasing pressure inside the tire 1 are described in detail later in the embodiments.

Figure 2:
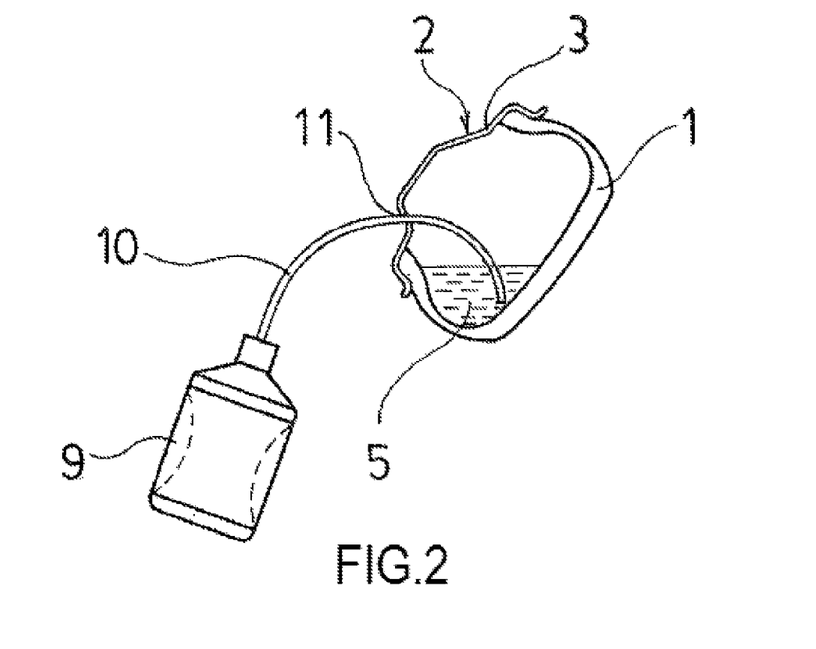
FIG. 2 is a cross-sectional view illustrating a modified example of the process of recovering the puncture repair liquid.

As illustrated in FIG. 2, in the process of recovering the puncture repair liquid 5, the tire valve 4 is removed from the wheel 2, the hose 10 is inserted into the tire 1 from an installation hole 11 of the tire valve 4, and the puncture repair liquid 5 may be recovered into the bottle 9 that is connected to the hose 10. Of course, the process of injecting the cleaning liquid 8 and the process of removing the cleaning liquid 8 can be carried out via the installation hole 11 of the tire valve 4 in the same way as for the process of recovering the puncture repair liquid 5.

Figure 3:
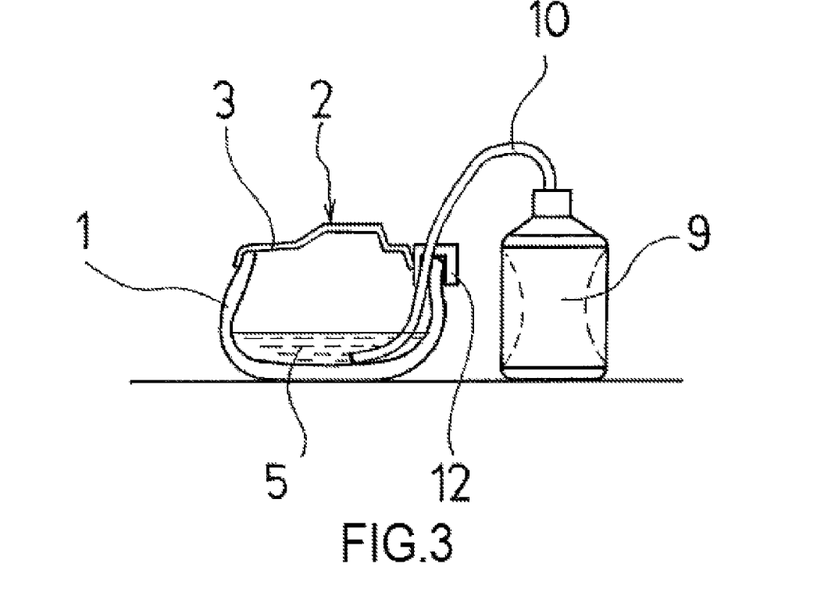
FIG. 3 is a cross-sectional view illustrating another modified example of the process of recovering the puncture repair liquid.

Also, as illustrated in FIG. 3, in the process of recovering the puncture repair liquid 5, a U-shaped tool 12 may be sandwiched between the rim 3 of the wheel 2 and the bead portion of the tire 1, the hose 10 may be inserted into the tire 1 from the gap formed by the tool 12, and the puncture repair liquid 5 may be recovered into the bottle 9 connected to the hose 10. Of course, the process of injecting the cleaning liquid 8 and the process of removing the cleaning liquid 8 can be carried out via the gap formed by the tool 12, in the same way as for the process of recovering the puncture repair liquid 5.

Figure 4:
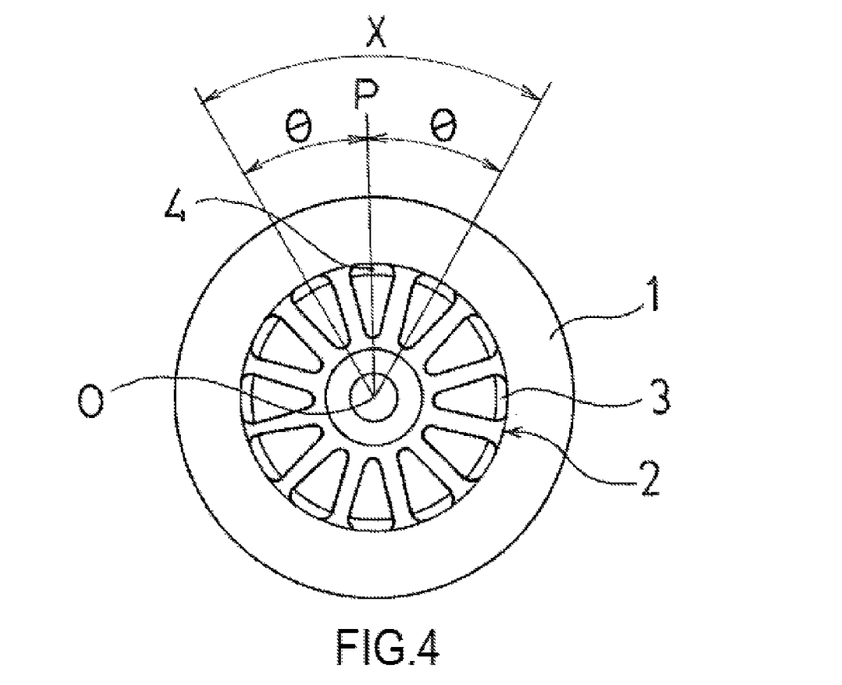
FIG. 4 is a side view illustrating the ideal tire arrangement in the process of injecting the cleaning liquid.
Figure 5:
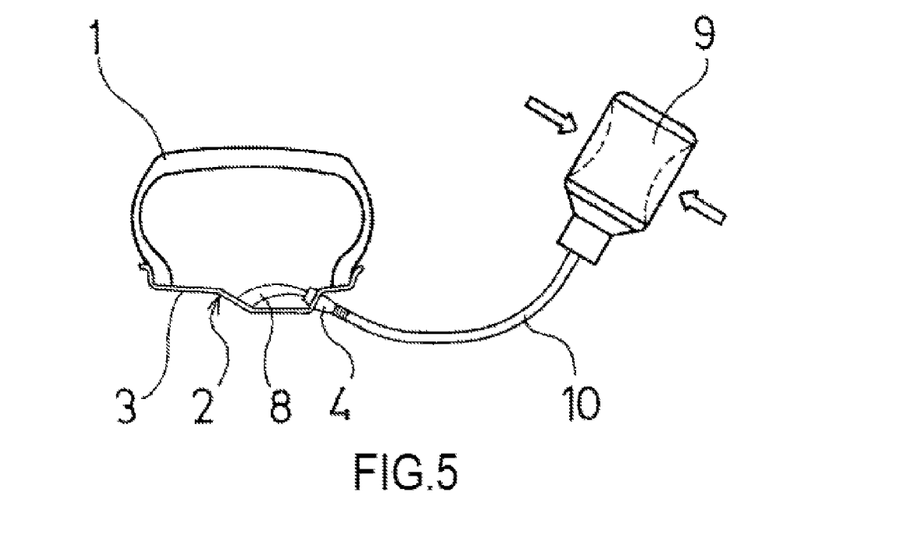
FIG. 5 is a cross-sectional view illustrating the process of injecting the cleaning liquid in the arrangement in FIG. 4.

In the embodiment as described above, as illustrated in FIG. 1B, in the process of injecting the cleaning liquid 8, the tire 1 is stood in an upright position with the rotational axis in the horizontal direction, and the cleaning liquid 8 injection position (in other words, the position of the tire valve 4) is arranged at the lower side of the tire 1. However, as illustrated in FIGS. 4 and 5, in the process of injecting the cleaning liquid 8, preferably the tire 1 is stood in the upright position so that the rotational axis is horizontal, and the position of injection of the cleaning liquid 8 (in other words, the position of the tire valve 4) is arranged on the upper side of the tire 1, and the cleaning liquid 8 is injected while applying the cleaning liquid 8 to the rim 3 of the wheel 2. In this way, when injecting the cleaning liquid 8, it is possible to directly apply the cleaning liquid 8 to the rim 3, so it is possible to efficiently carry out the cleaning operation, which contributes to reducing the operation time.

In this case, the position of injection of the cleaning liquid 8 may be arranged at the upper side of the tire 1, but more specifically, as illustrated in FIG. 4, preferably the position of injection of the cleaning liquid 8 is within a region X, where the region X is defined by angles θ of 30° measured about the axis of the rotational axis O on both sides in the tire circumferential direction from a point P directly above the rotational axis O of the tire 1 in the vertical direction. In this way, it is possible to obtain a more reliable cleaning effect of the rim 3.

FIG. 6 illustrates the tire cleaning method according to another embodiment of the present technology. In FIG. 6, components that are identical to those in FIG. 1 have been assigned the same symbols, and detailed descriptions of those components have been omitted.

Figure 6A:
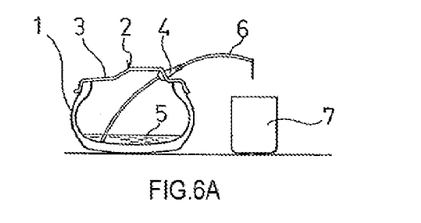
FIG. 6A is a cross-sectional view illustrating the process of recovering puncture repair liquid.

First, as illustrated in FIG. 6A, before removing the tire 1 from the rim 3 of the wheel 2, the puncture repair liquid 5 is recovered from inside the tire 1. In this case, a valve core that is not illustrated on the drawings is removed from the tire valve 4, then while the compressed air within the tire 1 is being discharged, the tube 6 is inserted from the tire valve 4 so that it reaches the inside surface of the tire 1, and the puncture repair liquid 5 is removed via the tube 6 from inside the tire 1 using the action of releasing the pressure within the tire 1 and stored in the container 7.

Figure 6B:
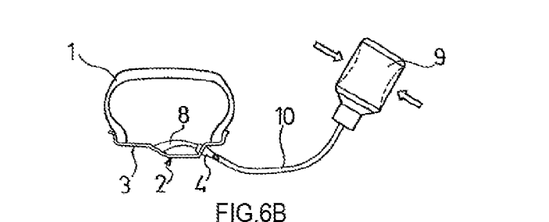
FIG. 6B is a cross-sectional view illustrating the process of injecting the cleaning liquid.

Next, as illustrated in FIG. 6B, the bottle 9 containing cleaning liquid 8 is connected to the tire valve 4 via a hose 10, and the cleaning liquid 8 is injected into the tire 1 by squeezing the bottle 9. In this case, the tire 1 is stood in the upright position so that the rotational axis of the tire 1 is in the horizontal direction, and the position of injection of the cleaning liquid 8 (in other words, the position of the tire valve 4) is arranged on the upper side of the tire 1, and the cleaning liquid 8 is injected while applying the cleaning liquid 8 to the rim 3 of the wheel 2.

Figure 6C:
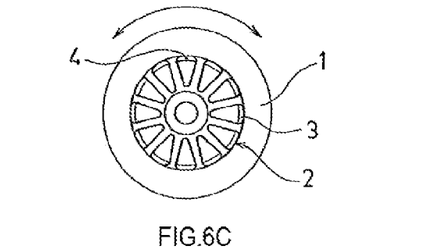
FIG. 6C is a side view illustrating the cleaning process.

Next, as illustrated in FIG. 6C, the inside of the tire 1 is cleaned with the cleaning liquid 8 by moving the tire 1. In this case, the tire 1 is in an upright position with the rotational axis in the horizontal direction, from this state the tire 1 may be rolled, the tire 1 may be tilted, and again the tire 1 may be stood upright, repeatedly.

Figure 6D:
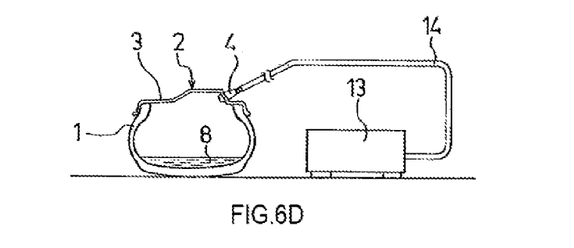
FIG. 6D is a cross-sectional view illustrating the process of inflating with inner pressure.

Next, as illustrated in FIG. 6D, an air compressor (compressed air supply source) 13 is connected to the tire valve 4 via a hose 14, and the tire internal pressure is increased by the compressed air supplied from the air compressor 13. In this case, the required pressure is, for example, 80 kPa to 120 kPa. An electrical air compressor, a bicycle pump, or the like, can be used as the compressed air supply source.

Figure 6E:
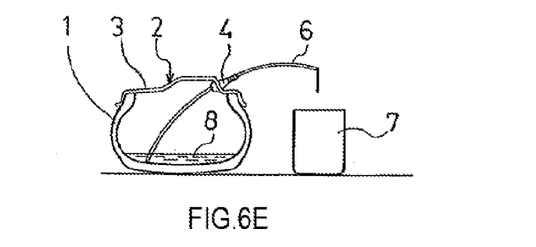
FIG. 6E is a cross-sectional view illustrating the process of removing the cleaning liquid.

Next, as illustrated in FIG. 6E, the tire valve 4 is opened, the tube 6 is inserted from the tire valve 4 so that it reaches the inside surface of the tire 1 while the compressed air within the tire 1 is being discharged, and the cleaning liquid 8 within the tire 1 is removed via the tube 6, using the action of releasing the pressure within the tire 1 and stored in the container 7.

In the process of recovering the puncture repair liquid 5 and the process of removing the cleaning liquid 8, if it was not possible to carry out the operation of inserting the tube 6 while the compressed air in the tire 1 was being discharged, the tire 1 may be filled with compressed air from the tire valve 4 with the valve core removed, and again the compressed air within the tire 1 may be discharged from the tire valve 4.

After cleaning the tire 1, the tire 1 is removed from the rim 3 of the wheel 2, and if necessary the inside surfaces of the tire 1 that has been cleaned with the cleaning liquid 8 are wiped with a cloth or the like. Then, the punctured tire 1 is reused after it has been repaired, or exchanged with another tire.

According to the tire cleaning method as described above, before removing the tire 1 from the rim 3 of the wheel 2 the puncture repair liquid 5 is recovered from inside the tire 1, cleaning liquid 8 is injected into the tire 1, the inside of the tire 1 is cleaned with the cleaning liquid 8 by moving the tire 1, and the cleaning liquid 8 is removed from inside the tire 1 after cleaning, so even if the puncture repair liquid 5 is removed from inside the tire 1 immediately after the tire 1 has been driven, the quantity of puncture repair liquid 5 adhering to the inside surfaces of the tire 1 and the rim 3 is reduced, so it is possible to speed up the process of replacing the tire 1. Also, because the quantity of puncture repair liquid 5 adhering to the inside surfaces of the tire 1 and the rim 3 is reduced, the operation of wiping the puncture repair liquid 5 is simplified, and it is also possible to prevent contamination of the workplace.

In the embodiment as described above, the process of recovering the puncture repair liquid 5, the process of injecting the cleaning liquid 8, and the process of removing the cleaning liquid 8 are carried out via the tire valve 4, and the series of operations are carried out with the tire 1 fitted to the rim 3 of the wheel 2, so the series of operations can be carried out efficiently, and moreover it is possible to prevent leakage of cleaning liquid 8 from the inside of tire 1 during cleaning.

In addition, in the process of recovering the puncture repair liquid 5, the puncture repair liquid 5 is recovered via the tube 6 from inside the tire 1 using the action of releasing the pressure inside the tire 1, and in the process of removing the cleaning liquid 8, the cleaning liquid 8 is removed from inside the tire 1 via the tube 6 using the action of releasing the pressure inside the tire 1, so these operations can be efficiently carried out.

FIG. 7 illustrates the tire cleaning method according to yet another embodiment of the present technology. In FIG. 7, components that are identical to those in FIG. 1 have been assigned the same symbols, and detailed descriptions of those components have been omitted.

Figure 7A:
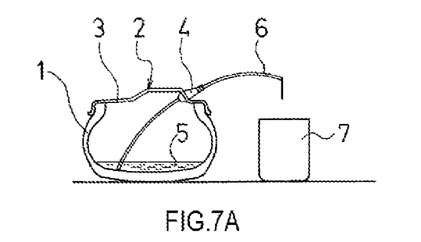
FIG. 7A is a cross-sectional view illustrating the process of recovering the puncture repair liquid.

First, as illustrated in FIG. 7A, before removing the tire 1 from the rim 3 of the wheel 2, the puncture repair liquid 5 is recovered from inside the tire 1. In this case, a valve core that is not illustrated on the drawings is removed from the tire valve 4, then while the compressed air within the tire 1 is being discharged the tube 6 is inserted from the tire valve 4 so that it reaches the inside surface of the tire 1, the puncture repair liquid 5 is removed via the tube 6 from inside the tire 1 using the action of releasing the pressure within the tire 1, and stored in the container 7.

Figure 7B:
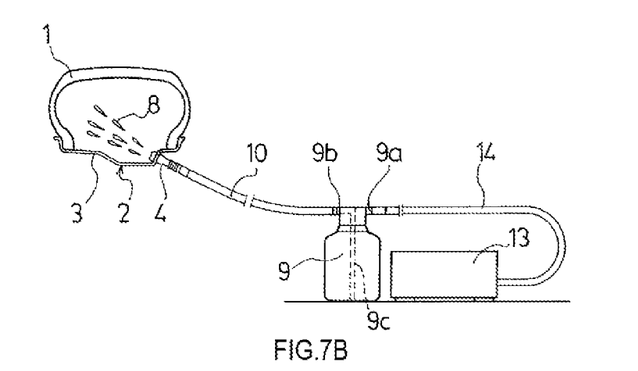
FIG. 7B is a cross-sectional view illustrating the process of injecting the cleaning liquid.

Next, after fitting the valve core to the tire valve 4, the bottle 9 containing the cleaning liquid 8 is connected between the tire valve 4 and the air compressor (compressed air supply source) 13, as illustrated in FIG. 7B. Specifically, an inlet 9a and an outlet 9b are provided on the top of the bottle 9, the inlet 9a is connected to the air compressor 13 via a hose 14, and the hose 10 is connected between the outlet 9b and the tire valve 4. An inner tube 9c that is connected to the outlet 9b and extends to the bottom of the bottle 9 is provided within the bottle 9. Therefore, when compressed air is supplied to the inlet 9a of the bottle 9 from the air compressor 13, the cleaning liquid 8 within the bottle 9 is discharged into the tire 1 together with the compressed air via the inner tube 9c, the outlet 9b, the hose 10, and the tire valve 4. In this case also, the tire 1 is stood in the upright position so that the rotational axis of the tire 1 is in the horizontal direction, and the position of injection of the cleaning liquid 8 (in other words, the position of the tire valve 4) is arranged on the upper side of the tire 1, and the cleaning liquid 8 is injected while applying the cleaning liquid 8 to the rim 3 of the wheel 2.

Figure 7C:
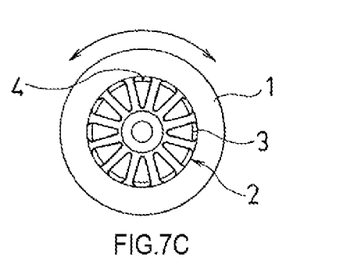
FIG. 7C is a side view illustrating the cleaning process.

Next, after the hose 10 is removed from the tire valve 4, the inside of the tire 1 is cleaned with the cleaning liquid 8 by moving the tire 1, as illustrated in FIG. 7C. In this case, the tire 1 is in an upright position with the rotational axis in the horizontal direction, from this state the tire 1 may be rolled, the tire 1 may be tilted, and again the tire 1 may be stood upright, repeatedly. The process of cleaning using the cleaning liquid 8 may be carried out with the hose 10 connected to the tire valve 4.

Figure 7D:
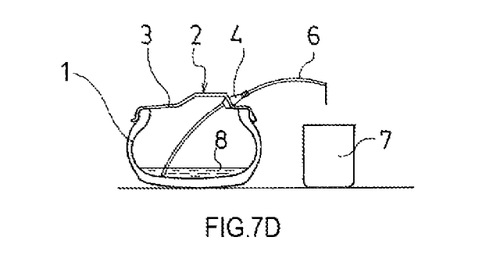
FIG. 7D is a cross-sectional view illustrating the process of removing the cleaning liquid.

Next, as illustrated in FIG. 7D, the valve core is removed from the tire valve 4 and the tire valve 4 is opened, the tube 6 is inserted from the tire valve 4 so that it reaches the inside surface of the tire 1 while the compressed air within the tire 1 is being discharged, the cleaning liquid 8 within the tire 1 is removed via the tube 6, using the action of releasing the pressure within the tire 1, and stored in the container 7.

After cleaning the tire 1, the tire 1 is removed from the rim 3 of the wheel 2, and if necessary the inside surfaces of the tire 1 that has been cleaned with the cleaning liquid 8 are wiped with a cloth or the like. Then, the punctured tire 1 is reused after it has been repaired, or exchanged with another tire.

According to the tire cleaning method as described above, the puncture repair liquid 5 is recovered from inside the tire 1 before removing the tire 1 from the rim 3 of the wheel 2, cleaning liquid 8 is injected into the tire 1, the inside of the tire 1 is cleaned with the cleaning liquid 8 by moving the tire 1, and the cleaning liquid 8 is removed from inside the tire 1 after cleaning, so even if the puncture repair liquid 5 is removed from inside the tire 1 immediately after the tire 1 has been driven, the quantity of puncture repair liquid 5 adhering to the inside surfaces of the tire 1 and the rim 3 is reduced, so it is possible to speed up the process of replacing the tire 1. Also, because the quantity of puncture repair liquid 5 adhering to the inside surfaces of the tire 1 and the rim 3 is reduced, the operation of wiping the puncture repair liquid 5 is simplified, and it is also possible to prevent contamination of the workplace.

In the embodiment as described above, the process of recovering the puncture repair liquid 5, the process of injecting the cleaning liquid 8, and the process of removing the cleaning liquid 8 are carried out via the tire valve 4, and the series of operations is carried out with the tire 1 fitted to the rim 3 of the wheel 2, so the series of operations can be carried out efficiently, and moreover it is possible to prevent leakage of cleaning liquid 8 from inside the tire 1 during cleaning.

In addition, in the process of recovering the puncture repair liquid 5, the puncture repair liquid 5 is recovered via the tube 6 from inside the tire 1 using the action of releasing the pressure inside the tire 1, and in the process of removing the cleaning liquid 8, the cleaning liquid 8 is removed from inside the tire 1 via the tube 6 using the action of releasing the pressure inside the tire 1, so these operations can be efficiently carried out. In particular, as illustrated in FIG. 7B, when the cleaning liquid 8 is injected into the tire 1 together with the compressed air, the cleaning liquid 8 is vigorously dispersed within the tire 1 so it is possible to get an excellent cleaning effect.

In each of the embodiments as described above, the process of cleaning using the cleaning liquid 8 need not be carried out only once but may be repeated a plurality of times, and in this way it is possible to increase the cleaning effect. Also, it is possible to carry out the process of recovering the puncture repair liquid 5, the process of injecting the cleaning liquid 8, and the process of removing the cleaning liquid 8 via the tire valve 4, but these processes can also be carried out when a sensor unit that contains a detecting device for detecting tire internal information such as the air pressure and temperature and the like is provided integrally with the tire valve 4.

Also, in each of the embodiments as described above, while the tube 6 is used for discharging the puncture repair liquid 5 or the cleaning liquid 8 from inside the tire 1 using the action of releasing the pressure inside the tire 1, it is necessary that the tube 6 can be inserted into the tire valve 4 and has at least the length to reach the inside surface of the tire 1 from the tire valve 4.

Figure 8:
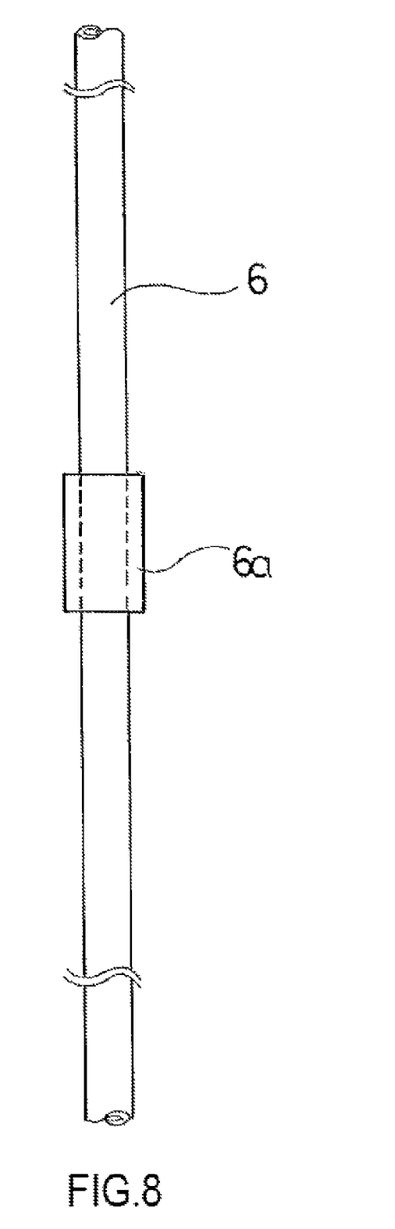
FIG. 8 is a side view illustrating an example of the tube used in the present technology.

FIGS. 8 to 11 illustrate examples of the tube used in the present technology. As illustrated in FIG. 8, a seal portion 6a that can be fitted to the tire valve 4 and whose external diameter is larger than that of the tube 6 is provided in the middle of the tube 6. More specifically, the seal portion 6a is configured from pipe material that is thicker than the tube 6, and is fitted so that it can freely slide in the longitudinal direction with respect to the tube 6. Therefore, by sliding the seal portion 6a along the longitudinal direction of the tube 6, it is possible to adjust the length of the inserted portion of the tube 6 in accordance with the tire size. It is preferable that the seal portion 6a can freely slide with respect to the tube 6, but it may also be formed integrally with the tube 6.

Figure 9:
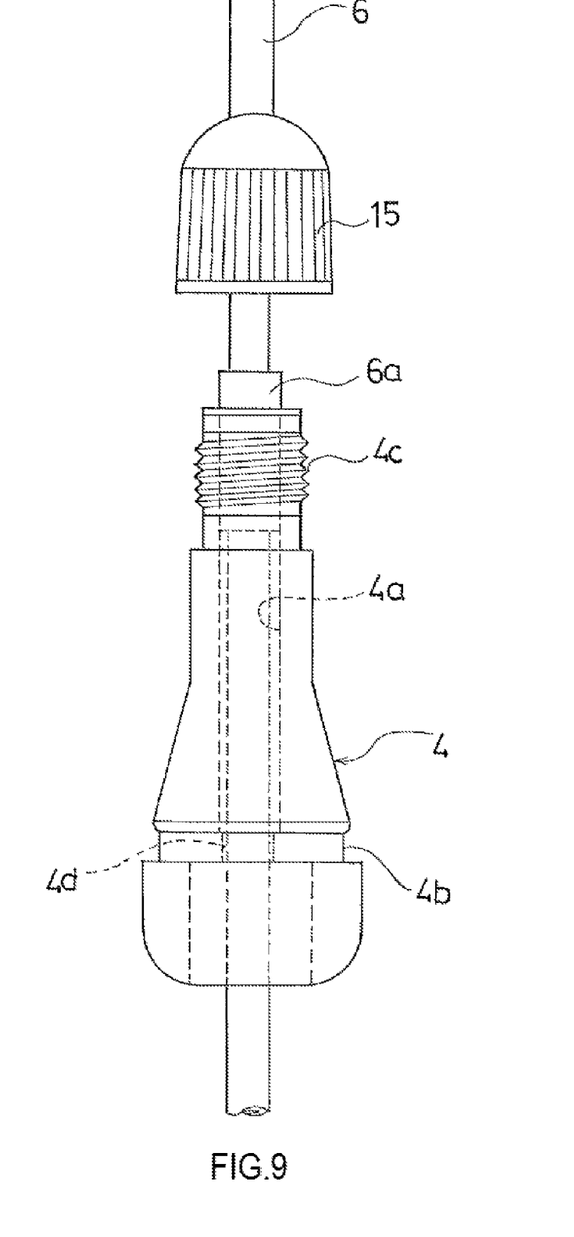
FIG. 9 is a side view illustrating the state when the tube of FIG. 8 is inserted into the tire valve.

As illustrated in FIG. 9, there is a cylindrical shaped through hole 4a (indicated on the drawings by dotted lines) within the tire valve 4, a constricted portion 4b that engages with the installation hole of the wheel 2 is formed at the base end thereof, and a male screw portion 4c is formed on the tip side. One part in the longitudinal direction of the through hole 4a is locally constricted and at that position a narrowest portion 4d is formed at which the internal diameter is the minimum. When filling with internal pressure, the valve core is inserted into the tire valve 4.

Taking into consideration the structure of the tire valve 4 as described above, the external diameter of the tube 6 is smaller than the internal diameter of the narrowest portion 4d of the through hole 4a of the tire valve 4, and the external diameter of the seal portion 6a is larger than the internal diameter of the narrowest portion 4d of the through hole 4a of the tire valve 4. Also, a small hole into which the tube 6 is inserted is formed on the top portion of a cap 15 for the tire valve, and when the tube 6 together with the seal portion 6a is inserted into the tire valve 4 so that the cap 15 is tightened onto the tire valve 4, it is possible for the seal portion 6a to be pressed into the tire valve 4 by the cap 15.

By providing the seal portion 6a with an external diameter larger than the tube 6 in the middle of the tube 6 so that it is capable of fitting into the tire valve 4, and fitting the seal portion 6a into the tire valve 4 when discharging puncture repair liquid 5 or cleaning liquid 8 from inside the tire 1, it is possible to prevent leakage of air from the gap between the tube 6 and the tire valve 4, so the operation of discharging the puncture repair liquid 5 or the cleaning liquid 8 can be efficiently carried out. In order to increase the air tightness, the seal portion 6a may have a wedge-shape that becomes narrower towards the tire valve 4.

While the material of the tube 6 is not limited in particular, rubber such as silicone rubber, a synthetic resin such as polypropylene, polyethylene, polyurethane, polyamide, or fluororesin, or metal and the like may be used. Polyethylene or polyurethane are preferred taking into consideration the operability of inserting the tube 6.

The length of the portion of the tube 6 inserted into the tire 1 may be 150 mm or more, and preferably is in the range of 150 mm to 250 mm. This is because the appropriate length varies depending on the tire size. Preferably the length of the portion of the tube 6 outside the tire is about from 50 mm to 300 mm taking operability into consideration. Therefore, the total length of the tube 6 is about from 200 mm to 550 mm. If the amount of the tube 6 inserted into the tire 1 is short or if it is too long, the end of the tube 6 within the tire 1 cannot be held at the appropriate position, so the operation of discharging the puncture repair liquid 5 or the cleaning liquid 8 becomes difficult.

The external diameter of the tube 6 may be within the range of 2.5 mm to 3.0 mm. If the tube 6 is too thick, it is difficult for the tube 6 to pass through the tire valve 4, and conversely if it is too thin, too much time is required for discharging the puncture repair liquid 5 or the cleaning liquid 8. Also, the internal diameter of the tube 6 may be within the range of 50% to 90% of the external diameter thereof. In this way, the tube 6 is given a certain amount of stiffness which ensures ease of insertion into the tire valve 4 and at the same time it is possible to increase the discharge efficiency of the puncture repair liquid 5 or the cleaning liquid 8. If the internal diameter of the tube 6 is too small, the efficiency of discharge of the puncture repair liquid 5 or the cleaning liquid 8 is reduced, and conversely if it is too large, the tube 6 becomes excessively flexible so it becomes difficult to insert it into the tire valve 4. For example, the internal diameter of the tube 6 can be set in the range of 1.5 mm to 2.0 mm with respect to the above external diameter.

On the other hand, the external diameter of the seal portion 6a may be within the range of 3.2 mm to 4.0 mm. If the seal portion 6a is too thick, it will be difficult to press the seal portion 6a into the tire valve 4, and conversely if it is too thin, it is difficult to ensure air tightness.

Figure 10A:
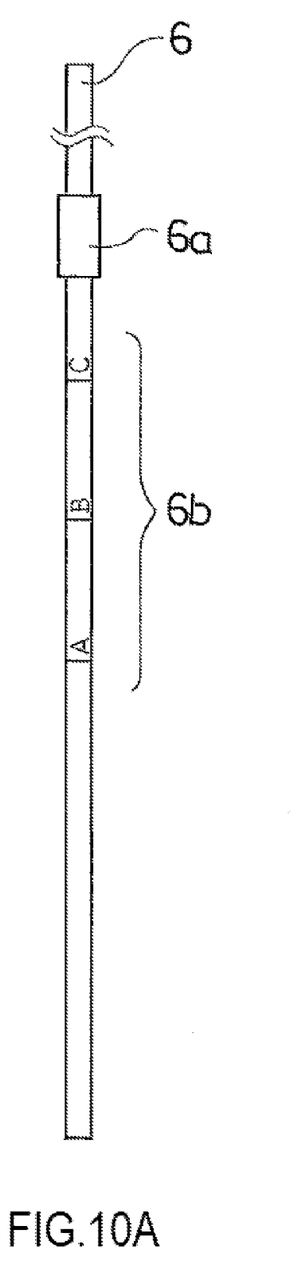
FIGS. 10A and 10B are each side views illustrating the main parts of the tube.
Figure 10B:
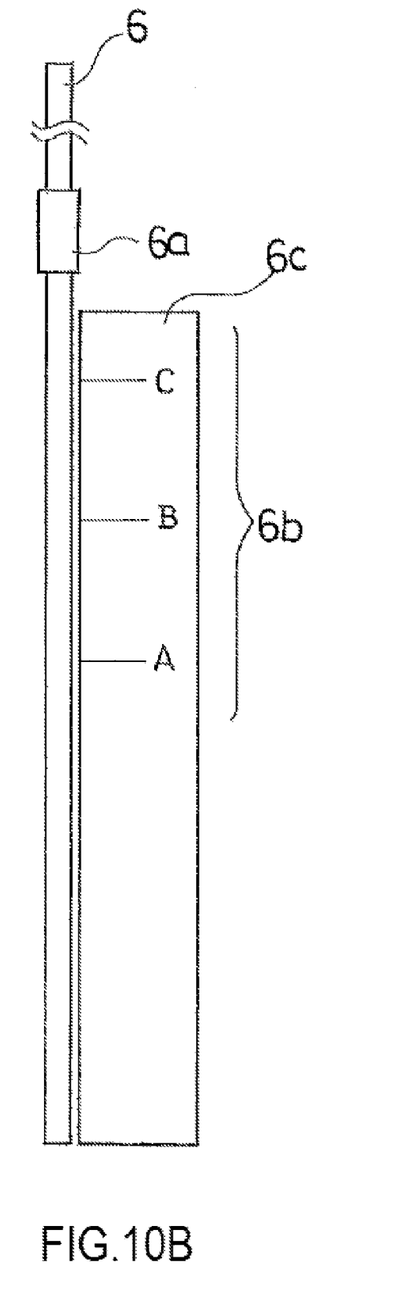

As illustrated in FIGS. 10A and 10B, the tube 6 is provided with graduations 6b indicating the position of the seal portion 6a with the alphabetic letters A to C, and the position of the seal portion 6a is selected in accordance with the tire size based on the graduations 6b. In other words, the length of the tube 6 is set to a dimension to enable it to be applied to all the tires that are envisaged, and by appropriately selecting the position of the seal portion 6a based on the graduations 6b, it is possible to appropriately deal with each tire size. In FIG. 10A, the graduations 6b are directly indicated on the tube 6. In FIG. 10B, the graduations 6b are printed on a sheet 6c made from paper or the like. This sheet 6c on which the graduations 6b are printed may be a dedicated sheet, or a portion of the instruction manual may be used. In each case the meaning of the graduations 6b is described in the instruction manual or the like. For example, the correspondence relationship between the alphabetical letters A to C of the graduations 6b and tire size is indicated in the instruction manual. The graduations 6b can be distinguished by varying the thickness of the lines, the color, or the number of lines, etc., or instead of the alphabetic letters as described above, numbers or symbols may be used.

Figure 11A:
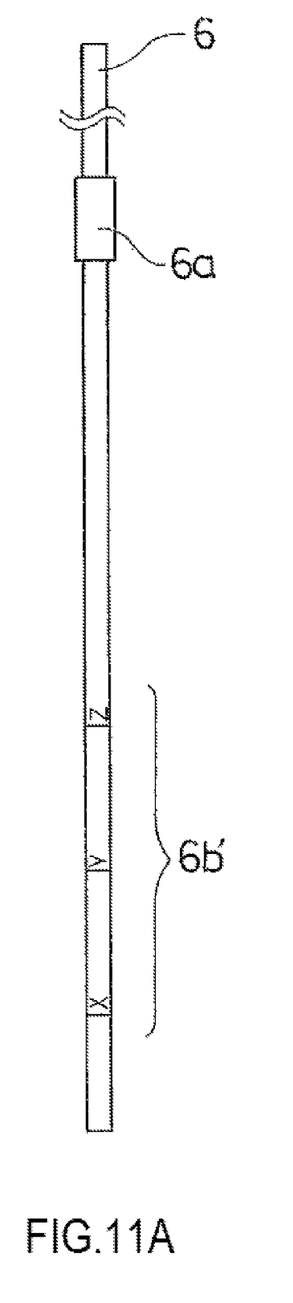
FIGS. 11A and 11B are each side views illustrating the main parts of the tube.
Figure 11B:
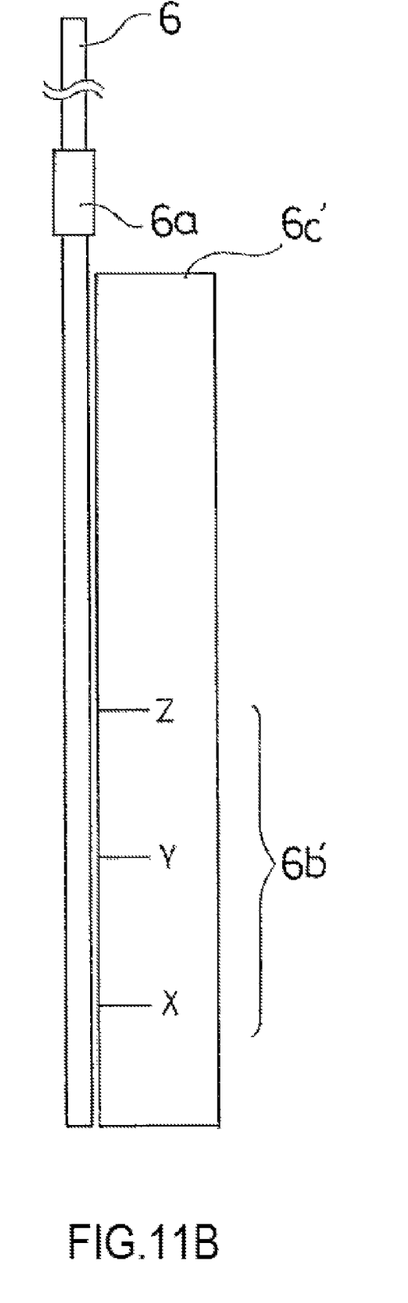

Instead of displacing the position of the seal portion 6a as described above, as illustrated in FIGS. 11A and 11B, graduations 6b' indicating the cut length of the tube 6 with alphabetic letters X to Z may be provided, and the tube 6 may be cut in accordance with the tire size based on the graduations 6b'. In other words, the length of the tube 6 before use is set to a dimension so that it can reach the internal surface of the tire 1 from the tire valve 4 for all of the envisaged tires, and by appropriately cutting the tube 6 based on the graduations 6b', each different tire size can be appropriately dealt with. In FIG. 11A, the graduations 6b' are directly indicated on the tube 6. In FIG. 11B, the graduations 6b' are printed on a sheet 6c' made from paper or the like. This sheet 6c' on which the graduations 6b' are printed may be a dedicated sheet, or a portion of the instruction manual may be used. In each case the meaning of the graduations 6b' is described in the instruction manual or the like. For example, the correspondence relationship between the alphabetical letters X to Z of the graduations 6b' and tire size is indicated in the instruction manual. The graduations 6b' can be distinguished by varying the thickness of the lines, the color, or the number of lines, etc., or instead of the alphabetic letters as described above numbers or symbols may be used.

What is claimed is:

1. A method of cleaning a tire in which puncture repair liquid has been used, comprising the steps of:
    recovering puncture repair liquid from an inside of a tire before removing the tire from a rim of a wheel using a tube inserted via the tire valve to an inside surface of the tire together with an action of releasing compressed air pressure within the tire;
    injecting cleaning liquid into the tire from which the puncture repair liquid has been recovered;
    cleaning the inside of the tire with the cleaning liquid by moving the tire; and
    removing the cleaning liquid from the inside of the cleaned tire.

2. The tire cleaning method according to claim 1, wherein the steps of recovering the puncture repair liquid, injecting the cleaning liquid, and removing the cleaning liquid are carried out via a tire valve, and a series of the steps is carried out with the tire fitted to the rim of the wheel.

3. A method of cleaning a tire in which puncture repair liquid has been used, comprising the steps of:
    removing a valve core from a tire valve of a wheel to which a tire that includes puncture repair liquid is fitted;
    inserting a tube via the tire valve so that the tube reaches an inside surface of the tire;
    recovering the puncture repair liquid from an inside of the tire via the tube using an action of releasing compressed air pressure within the tire;
    injecting cleaning liquid into the tire from which the puncture repair liquid has been recovered via the tire valve;
    cleaning the inside of the tire with the cleaning liquid by moving the tire;
    opening the tire valve after increasing an internal pressure of the cleaned tire;
    inserting the tube via the tire valve so that the tube reaches the inside surface of the tire; and
    removing the cleaning liquid from the inside of the tire via the tube using an action of releasing pressure within the tire.

4. A method of cleaning a tire in which puncture repair liquid has been used, comprising the steps of:
    removing a valve core from a tire valve of a wheel to which a tire that includes puncture repair liquid is fitted;
    inserting a tube via the tire valve so that the tube reaches an inside surface of the tire;
    recovering the puncture repair liquid from an inside of the tire via the tube using an action of releasing compressed air pressure within the tire;
    connecting a bottle containing cleaning liquid to the tire valve and a compressed air supply source;
    injecting the cleaning liquid together with compressed air supplied from the compressed air supply source into the tire via the tire valve;
    cleaning the inside of the tire with the cleaning liquid by moving the tire;
    opening the tire valve after cleaning;
    inserting the tube via the tire valve so that the tube reaches the inside surface of the tire; and
    removing the cleaning liquid from the inside of the tire via the tube using an action of releasing pressure within the tire.

5. The tire cleaning method according to claim 4, wherein, in the step of injecting the cleaning liquid, the tire is stood in an upright position, and a location of injecting the cleaning liquid is arranged to be at a top of the tire, and the cleaning liquid is injected while applying the cleaning liquid to the rim of the wheel.

6. The tire cleaning method according to claim 1, wherein, in the step of injecting the cleaning liquid, the tire is stood in an upright position, and a location of injecting the cleaning liquid is arranged to be at a top of the tire, and the cleaning liquid is injected while applying the cleaning liquid to the rim of the wheel.

7. The tire cleaning method according to claim 2, wherein, in the step of injecting the cleaning liquid, the tire is stood in an upright position, and a location of injecting the cleaning liquid is arranged to be at a top of the tire, and the cleaning liquid is injected while applying the cleaning liquid to the rim of the wheel.

8. The tire cleaning method according to claim 3, wherein, in the step of injecting the cleaning liquid, the tire is stood in an upright position, and a location of injecting the cleaning liquid is arranged to be at a top of the tire, and the cleaning liquid is injected while applying the cleaning liquid to the rim of the wheel.

9. The tire cleaning method according to claim 3, wherein inserting the tube via the tire valve is performed while releasing the compressed air pressure.

10. The tire cleaning method according to claim 4, wherein the compressed air pressure is at least 80 kPa.

* * * * *